United States Patent
Ho (10) Patent No.: US 8,306,002 B2
(45) Date of Patent: Nov. 6, 2012

(54) WIRELESS COMMUNICATION TECHNIQUE COMPRISING MULTIPLE BEACONS IN EACH COMMUNICATIONS SUPERFRAME

(75) Inventor: Jin-Meng Ho, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 1075 days.

(21) Appl. No.: 11/023,690

(22) Filed: Dec. 28, 2004

(65) Prior Publication Data

US 2005/0226203 A1 Oct. 13, 2005

Related U.S. Application Data

(60) Provisional application No. 60/559,885, filed on Apr. 5, 2004.

(51) Int. Cl.
*H04L 12/413* (2006.01)
(52) U.S. Cl. .......................... 370/338; 370/445
(58) Field of Classification Search .................. 370/254, 370/338, 445–448, 255, 256, 257, 258, 310, 370/310.1, 310.2, 311, 312, 328, 329, 346, 370/349, 351, 352, 396, 398, 395.4, 395.41, 370/395.42, 395.5, 400, 401, 406, 407, 408, 370/409, 432, 449, 460, 461, 462, 469, 470, 370/471, 472, 473, 474, 475, 476
See application file for complete search history.

(56) References Cited

U.S. PATENT DOCUMENTS

| | | | | |
|---|---|---|---|---|
| 6,751,248 | B1 * | 6/2004 | Tan | 375/132 |
| 6,925,064 | B2 * | 8/2005 | Hester et al. | 370/255 |
| 7,002,938 | B2 * | 2/2006 | Hester et al. | 370/330 |
| 7,035,240 | B1 * | 4/2006 | Balakrishnan et al. | 370/338 |
| 7,352,728 | B2 * | 4/2008 | Soomro | 370/338 |
| 7,411,919 | B2 * | 8/2008 | Tavli et al. | 370/315 |
| 7,764,706 | B2 * | 7/2010 | Tavli et al. | 370/444 |
| 2002/0025810 | A1 * | 2/2002 | Takayama et al. | 455/432 |
| 2002/0044533 | A1 * | 4/2002 | Bahl et al. | 370/255 |
| 2004/0184477 | A1 * | 9/2004 | Tavli et al. | 370/461 |
| 2005/0192037 | A1 * | 9/2005 | Nanda et al. | 455/509 |
| 2011/0310862 | A9 * | 12/2011 | Doyle et al. | 370/338 |

FOREIGN PATENT DOCUMENTS

EP 0 511 925 A2 * 4/1992

* cited by examiner

*Primary Examiner* — Ajit Patel
(74) *Attorney, Agent, or Firm* — Steven A. Shaw; W. James Brady; Frederick J. Telecky, Jr.

(57) ABSTRACT

In accordance with various embodiments, multiple beacons are transmitted in each communication superframe within a wireless network. In accordance with one embodiment, for example, a method is disclosed that comprises transmitting a first beacon in a superframe and transmitting a second beacon in the superframe. The first beacon comprises wireless medium access information that specifies nodes that are to communicate across a wireless medium in that superframe. The second beacon also comprises wireless medium access information. The first and second beacons further specify a list of nodes that are to transmit the first beacons in subsequent superframes upon failure to receive the first beacon for a corresponding predetermined number of superframes.

13 Claims, 5 Drawing Sheets

130 — TRANSMIT A PRIMARY BEACON SPECIFYING AN ORDER AT WHICH OTHER NODES ARE TO TRANSMIT SECONDARY BEACONS

132 — TRANSMIT A SECONDARY BEACON AT THE TIME SPECIFIED IN THE PRIMARY BEACON

BEACON PRIMARY FIELD FORMAT — 150

| OCTETS: 8 | 2 | 6 | 8 | 1 | 1 |
|---|---|---|---|---|---|
| BEACON COUNTER | SUPERFRAME DURATION | BEACON SET ID | BEACON TA | BEACON COUNTDOWN | RESERVED |
| 164 | 166 | 168 | 170 | 172 | 174 |

FIG. 5C

STATIC MEDIUM ACCESS IE FORMAT — 152

| OCTETS: 1 | 1 | 6 | ○ ○ ○ | 6 |
|---|---|---|---|---|
| IE ID | LENGTH | ACCESS INTERVAL 1 | ○ ○ ○ | ACCESS INTERVAL m (m≤42) |
| 176 | 178 | 180 | | 180 |

DYNAMIC MEDIUM ACCESS IE FORMAT — 154

| OCTETS: 1 | 1 | 2 | 6 | ○ ○ ○ | 2 | 6 |
|---|---|---|---|---|---|---|
| IE ID | LENGTH | BEACON OFFSET 1 | ACCESS INTERVAL 1 | ○ ○ ○ | BEACON OFFSET n (n≤31) | ACCESS INTERVAL n (n≤31) |
| 182 | 184 | 186 | 180 | | 186 | 180 |

ACCESS INTERVAL FORMAT — 180

| 1 | 1 | 2 | 2 |
|---|---|---|---|
| SENDING NODE ID | RECIPIENT NODE ID | ACCESS START | ACCESS END |
| 188 | 190 | 192 | 194 |

WIRELESS COMMUNICATION TECHNIQUE COMPRISING MULTIPLE BEACONS IN EACH COMMUNICATIONS SUPERFRAME

RELATED APPLICATON

This application claims priority to the provisional patent application No. 60/559,885 entitled "Hybrid Centralized-distributed Beaconing for Autonomous Shared Medium Access," filed Apr. 5, 2004 and incorporated herein by reference.

BACKGROUND

In a wireless communication network, two or more wireless-capable devices (e.g., computers) communicate with one another over a wireless medium. Most wireless networks include a provision to coordinate access to the wireless medium in an attempt to avoid message "collisions" in which two or more messages are received simultaneously thereby interfering with each other. In some networks, "beacons" are transmitted periodically to coordinate access to the wireless medium. Each beacon comprises a packet of information that identifies the nodes that are to access the wireless medium in a communication superframe associated with the beacon. Some nodes, such as a laptop computer, are mobile and thus can be moved relative to other nodes. That being the case, a node that is currently transmitting beacons may be moved away from other nodes thereby precluding such other nodes from receiving the beacons. The physical separation of a beacon transmitting node from a beacon receiving node may result from the transmitting node being moved away from the receiving node, or vice versa. In any case, if one or more nodes are unable to receive the beacons, coordinated access to the wireless medium may be impaired.

SUMMARY

Various embodiments are described herein of a wireless network in which multiple beacons are transmitted in each communication superframe. In accordance with at least one embodiment, a method is disclosed that comprises transmitting a first beacon in a superframe and transmitting a second beacon in the superframe. The first beacon comprises wireless medium access information that specifies nodes that are to communicate across a wireless medium in that superframe. The second beacon also comprises wireless medium access information.

In accordance with another embodiment of the invention, a method comprises receiving a first beacon in a superframe and transmitting a second beacon in the superframe. The first beacon comprises wireless medium access information that specifies nodes that are to communicate across a wireless medium in that superframe. The second beacon also comprises the wireless medium access information.

In accordance with another embodiment of the invention, a method comprises transmitting a first beacon in a superframe and receiving a second beacon in the superframe. The first beacon comprises wireless medium access information that specifies nodes that are to communicate across a wireless medium in that superframe. The second beacon also comprises the wireless medium access information.

In yet another embodiment, a node comprises host logic and a wireless transceiver coupled to the host logic. The wireless transceiver receives a first beacon within a superframe, wherein the first beacon comprises wireless medium access information pertaining to that superframe. Further, the wireless transceiver transmits a second beacon within the superframe. The second beacon also comprises wireless medium access information.

In yet another embodiment, a system comprises a plurality of nodes, including a primary node, that wirelessly communicate across a wireless medium in a series of superframes. In each superframe, the primary node transmits a primary beacon to designate the nodes that are to access the wireless medium in that superframe. In the same superframe, a node other than the primary node transmits a secondary beacon that also designates the nodes that are to access the wireless medium in that superframe.

BRIEF DESCRIPTION OF THE DRAWINGS

For a detailed description of exemplary embodiments of the invention, reference will now be made to the accompanying drawings in which.

NOTATION AND NOMENCLATURE

Certain terms are used throughout the following description and claims to refer to particular system components. As one skilled in the art will appreciate, companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct electrical connection. Thus, if a first device couples to a second device, that connection may be through a direct electrical connection, or through an indirect electrical connection via other devices and connections. The term "system" refers to a combination of two or more components and may be used in any one of a variety of contexts such as a communication system, a sub-system of a communication device, a system of wireless nodes, etc. The term "piconet" refers to a network of two or more wireless devices.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Figure 1:
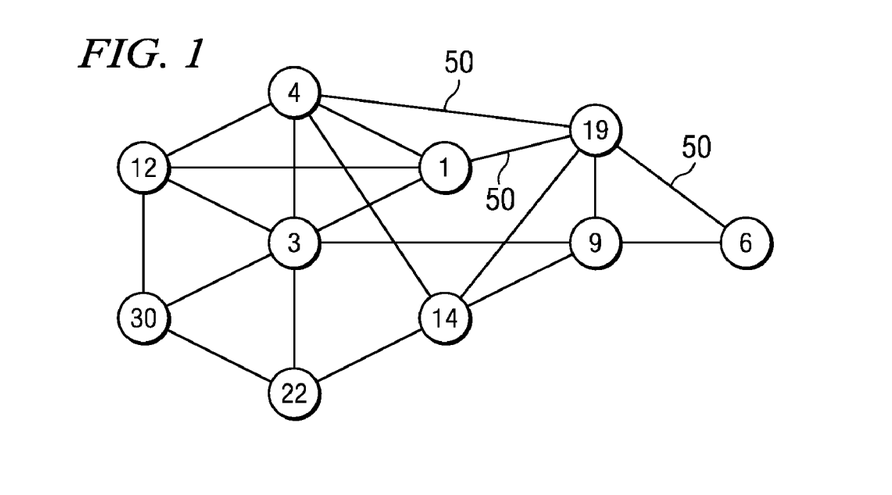
FIG. 1 shows a wireless communication network comprising a plurality of nodes.

Referring now to FIG. 1, a wireless communication network is shown comprising two or more nodes. In the exemplary wireless communication network of FIG. 1, the network comprises nodes labeled as node 1, node 3, node 4, node 6, node 9, node 12, node 14, node 19, node 22, and node 30.

Each node in the network is capable of wirelessly communicating with one or more other nodes in the network. The lines 50 interconnecting the various nodes depict the possible communication paths within the network. For example, node 1 is within wireless communication range of nodes 3, 4, 12, and 19 and thus is shown interconnected to those nodes in FIG. 1 by way of four connection lines 50. By way of further example, node 6 is connected by two lines 50 to nodes 9 and 19 to indicate that node 6 is within communication range of nodes 9 and 19. Node 6, however, is not shown as being connected to any of the other nodes in the network, thereby indicating that node 6 is not within communication range of such other nodes. For example, node 6 is not within communication range of node 12. Two nodes that are within direct wireless communication range of each other are said to be "immediate neighbors."

Figure 2:
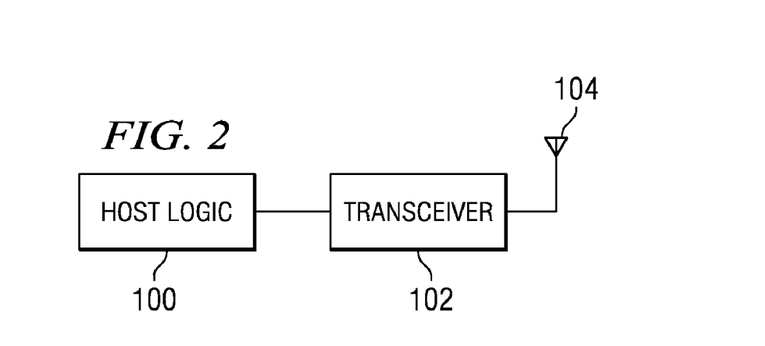
FIG. 2 shows an embodiment of a node.

Each node in the network can be any type of wireless-enabled communication device such as a computer, a personal data assistant (PDA), and the like. FIG. 2 shows an exemplary embodiment of a typical node as comprising host logic 100 coupled to a transceiver 102. An antenna 104 is connected to the transceiver 102 to provide wireless communication (e.g., radio communication) to other nodes in the network. The transceiver 102 is capable both of transmitting data to and receiving data from other nodes. As such, the communication links between nodes generally comprises a bi-directional communication path. The host logic performs various functions specific to the node. In the case in which a node is a computer, the host logic 100, for example, would include the computer's processor, memory, etc.

In accordance with a preferred embodiment of the invention, one or more nodes are capable of transmitting a "beacon" frame. A beacon is received by any node within communication range of the node that transmits the beacon. In general, beacons are used to coordinate access to the wireless medium among the various nodes in the network. The use and format of a beacon will be further described in detail below.

It can be observed from FIG. 1 that a node can be within communication range of one or more other nodes, but out of communication range from still other nodes. The group of nodes that are outside the communication range of a particular node fall into two categories. In a first category are nodes that are within communication range of a node that itself is within communication range of the particular node. For example, nodes 1, 3, 4, and 14 are outside the communication range of node 6 but are within communication range of either or both of nodes 9 and 19 which are themselves within communication range of node 6.

A second category of "out of communication range" nodes are those nodes that are not even within communication range of a node that is within radio range of a given node. Referring to the example of FIG. 1 again, this latter category of nodes comprises nodes 12, 22, and 30. Nodes 12, 22, and 30 are not within communication range of a node that is within communication range of node 6. For example, node 12 is within communication range of nodes 1, 3, and 4, but none of nodes 1, 3, and 4 are themselves within communication range of node 6.

A communication superframe comprises a period of time during which one or more wireless devices are permitted access to the wireless medium to transfer data. Each communication superframe includes at least one beacon, preferably at or near the beginning of the superframe, that specifies which beacon or beacons are to be transmitted to the wireless medium during that particular superframe. The preferred embodiment of the invention comprises transmitting multiple beacons in each communication superframe. The embodiments described below illustrate the transmission of two beacons in each superframe—a "first" beacon (also called a "primary" beacon) and a "second" beacon (also called a "secondary" beacon).

Figure 3:
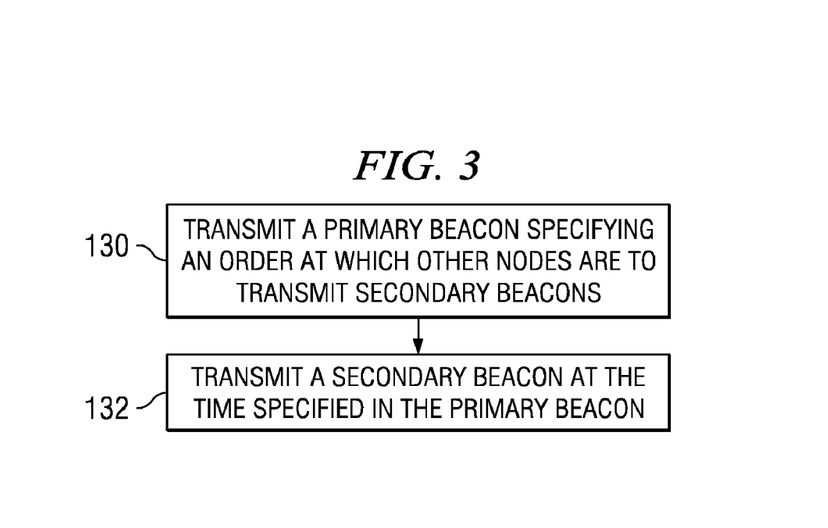
FIG. 3 illustrates a method embodiment.

FIG. 3 illustrates a method embodiment comprising actions 130 and 132. At 130, the method comprises transmitting a primary beacon which specifies an order at which other nodes are to transmit secondary beacons. Based on this latter information, a node in the system, other than the node transmitting the primary beacon (the "primary node"), transmits the secondary beacon (block 132). Thus, each communication superframe comprises the transmission of a primary beacon and a secondary beacon. Preferably, the secondary beacons comprise the same, or at least substantially the same, wireless medium access information as the primary beacon. The secondary beacon thus provides redundancy. Redundant beacons may be useful for any of a variety of reasons. For instance, the primary node may experience a malfunction that precludes successful transmission of the primary beacons. Further still, the primary node may be moved relative to one or more of the other nodes in the network such a distance that the one or more nodes may not be capable of successfully receiving the primary beacons.

In accordance with a preferred embodiment of the invention, one particular node in the network may be designated as the primary node, that is, the node to transmit the primary beacons. That particular node can be selected in accordance with any of a variety of techniques. For example, the primary node may be selected based on certain capabilities such as power supply level, physical location, and advanced signal processing capability. In other embodiments, the primary node may be pre-selected and/or factory set. Preferably, the primary node continues to function as the primary node and transmit a primary beacon in each communication superframe. In the event the primary node can no longer function in its capacity, a different node is selected to be the new primary node. The primary and/or secondary beacons may include a list of nodes suitable to be future primary nodes. Further, the list may specify an order at which the nodes are to become primary nodes.

Figure 4:
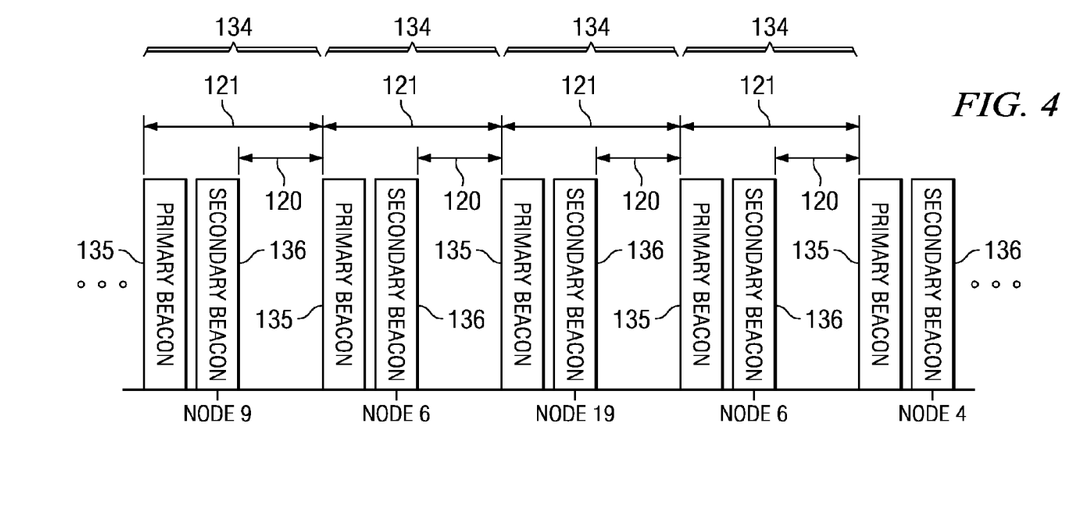
FIG. 4 illustrates multiple beacons transmitted in each communication superframe.

FIG. 4 illustrates an exemplary time sequence of communication superframes 134. The time period that defines the length of each communication superframe is illustrated by reference numeral 121. As shown, each communication superframe includes a primary beacon 135 and a secondary beacon 136. The time between beacons (the "data interval"), denoted by reference numeral 120 comprises time in which one or more nodes may access the wireless medium to transmit data. Information that dictates how and when the wireless medium is to be accessed is provided in the primary and secondary beacons. In the example of FIG. 4, a single secondary beacon is transmitted in each communication superframe. Further, the node that is to transmit the secondary beacons can change from superframe to superframe. In the example of FIG. 4 node 9 followed by nodes 6, 19, 6, and 4, respectively, are the secondary nodes. In other embodiments, the same node may transmit secondary beacons in consecutive superframes. In yet other embodiments, a plurality of secondary beacons can be transmitted in each communication superframe.

Figure 5A:
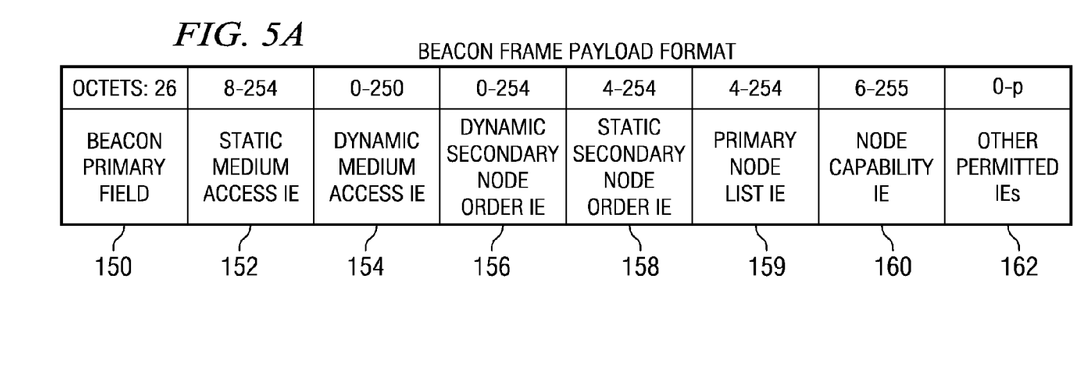
FIGS. 5A-5F illustrate an embodiment of a beacon superframe in accordance with a preferred embodiment of the invention.
Figure 5B:
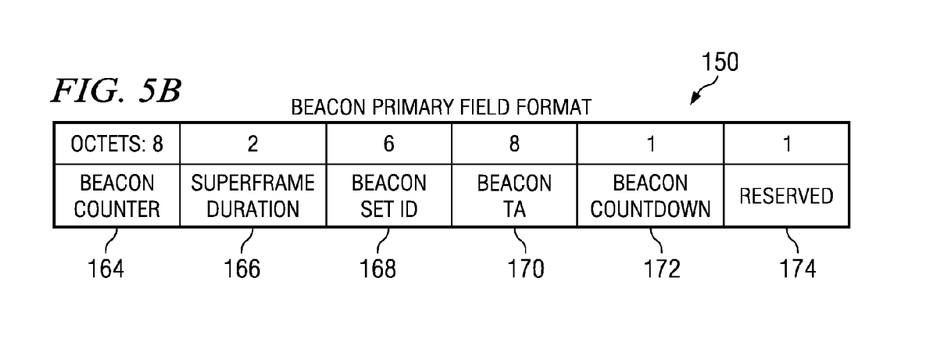

The preferred format of a beacon will be illustrated below with respect to FIGS. 5A through 5E. The format illustrated in FIGS. 5A-5E apply to primary beacons as well as secondary beacons. Referring to FIG. 5A, a preferred embodiment of a beacon frame payload is illustrated as comprising a plurality of fields. Such fields include a beacon primary field 150, a static medium access information element (IE) 152, a dynamic medium access IE 154, a dynamic secondary node order IE 156, a static secondary node order IE 158, a primary node list IE 159, a node capability IE 160, and one or more other IEs 162 if desired. FIG. 5B illustrates a preferred embodiment of the beacon primary field 150. As shown, the beacon primary field 150 comprises a beacon counter 164, a superframe duration 166, a beacon set ID 168, a beacon transmitter address 170, a beacon countdown value 172 and a reserved field 174. The beacon counter 164 specifies a unique, preferably sequential number associated with the beacon containing this parameter. The beacon counter is incremented by one for each beacon to be transmitted in the next superframe. Each node that is to transmit a beacon generates the beacon counter by incrementing the beacon counter in the beacon received or expected in the last superframe.

Referring still to FIG. 5B, the superframe duration 166 specifies the length of the superframe, in units of microseconds, where this beacon is transmitted. The beacon set ID 168 identifies the set of beacons transmitted by the device. The beacon transmitter address 170 specifies the address of the node sending the beacon referenced in the beacon counter 164. The beacon countdown value 172 specifies the number of beacon intervals before an access change, if any, specified in the current beacon (if the beacon contains new or modified access change information) takes effect. The beacon countdown value may initially be set to a NumCountdownInitial (NCI) value and then decremented by one in each successive superframe until reaching the value of zero. The value of zero for the beacon countdown indicates that the change is to take effect in the current superframe or took effect since an earlier superframe, while a value of one indicates that the change is to take effect in the subsequent superframe. A change may be made when another change is yet to take place, that is, when the beacon countdown value is nonzero, by resetting the beacon countdown to the NCI value. The superframe duration 166 and beacon set ID 168 may be changed via the access change frames.

Figure 5C:
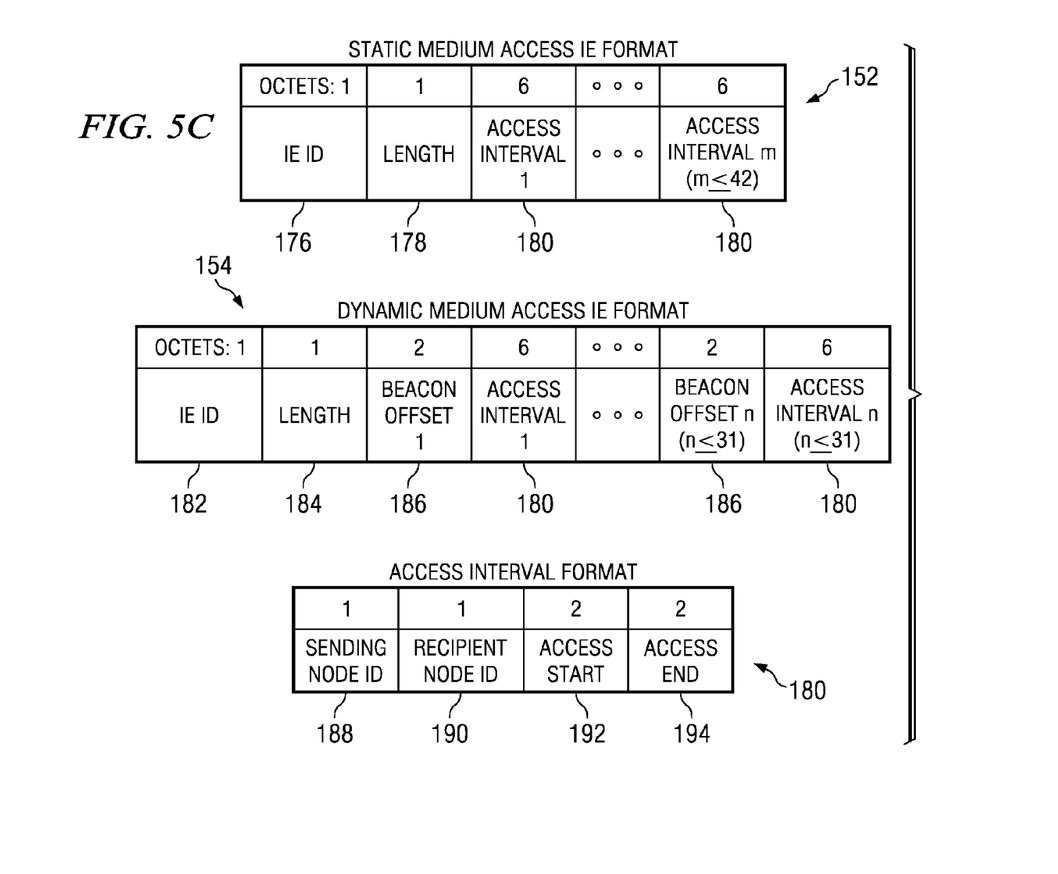

FIG. 5C shows a preferred embodiment of the static medium access IE 152 and the dynamic medium access IE 154. The static medium access IE 152 includes an IE ID 176, a length value 178, and one or more access intervals 180. The IE ID field 176 comprises an identifier that identifies the information element as the static medium access IE. The length value 178 specifies the length of the field that follows this length field in this static medium access IE; from the length value the number of access intervals 180 can be determined by nodes receiving the beacon. Each access interval comprises a format such as that shown in FIG. 5C as including a sending node ID 188, a recipient node ID 190, an access start value 192, and an access end value 194. Each access interval 180 specifies a time interval for wireless medium access that is valid in each superframe following the beacon in which the beacon countdown 172 is set to zero. The sending node ID 188 identifies the node that is permitted to transmit in the associated time interval. In some embodiments, the sending node ID 188 may be encoded as a broadcast node ID or a multicast node ID which means that all of the nodes (for a broadcast situation) or the nodes associated with the multicast node ID (for a multicast situation) may transmit in this time interval based on a suitable contention algorithm (e.g., a binary backoff carrier sense multiple access ("CSMA") algorithm). The recipient node ID 190 identifies the node required to receive in this time interval. If the recipient node ID is set to the broadcast node ID or a multicast node ID, all of the active nodes or the active nodes associated with the multicast node ID are potential intended recipients in this time interval.

The access start value 192 specifies the start time, preferably in units of microseconds, of this access time interval relative to the start of the superframe in which this time interval is located. A value of zero for the access start value 192 indicates that this time interval may start in this superframe anywhere outside the beacons and the other time intervals specified in the static medium access IE 152 and dynamic medium access IE 154 contained in this beacon or other beacons. The access end value 194 specifies the end time, in units of microseconds, of this time interval relative to the start of the superframe in which this time interval is located. As with the start value 192, a value of zero indicates that this time interval may end in this superframe anywhere outside the beacons and the other time intervals specified in the applicable static medium access IE and dynamic medium access IE contained in this or other beacons.

FIG. 5C also shows the format of the dynamic medium access IE 154 comprising an IE ID 182, a length value 184, one or more beacon offset values 186 and an access interval 180 associated with each beacon offset 186. The format of each such access interval 180 is also shown in FIG. 5C and was discussed above. The IE ID field 182 comprises a value that identifies that information element as the dynamic medium access IE. The length field 184 specifies the length of the field that follows this length field in this dynamic medium access IE 154 and thereby defines the number of beacon offset and access interval pairs contained within the information element 154. Each beacon offset 186 is paired with the subsequent access interval 180 and specifies a superframe, relative to the current superframe, to which the paired access interval applies. A value of zero for the beacon offset 186 indicates that the paired access interval 180 is valid in the current superframe, while a value of one indicates that the paired access interval is valid in the next superframe, and so on. Each access interval 180 in the dynamic medium access IE 154 is paired with the preceding beacon offset and specifies a time interval for medium access that is valid only in the superframe referenced in that beacon offset relative to the beacon counter 164.

Figure 5D:
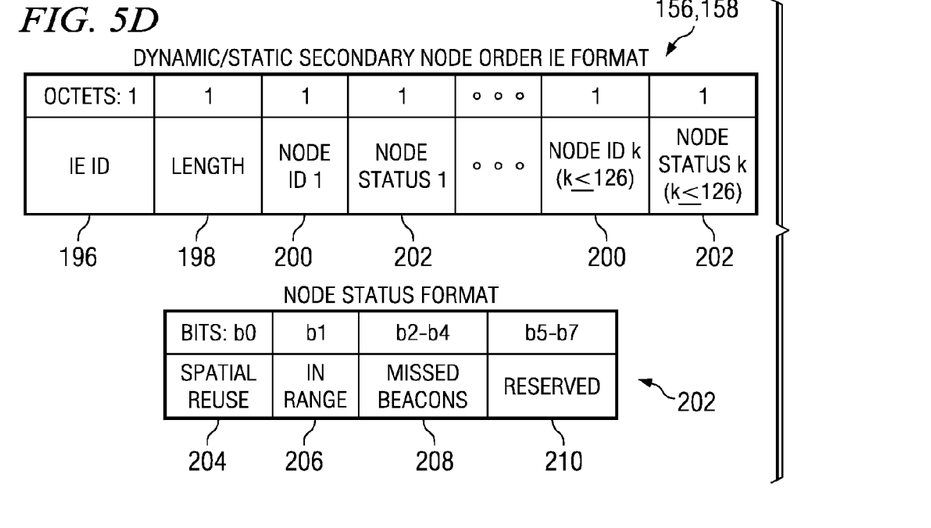

The format of the dynamic secondary node order and static secondary node order IEs 156 and 158 is as shown in FIG. 5D and includes an IE ID 196, a length value 198, one or more node IDs 200, and a node status 202 associated with each node ID 200. The IE ID 196 comprises a value that defines the information element as either a dynamic node order IE 156 or a static node order IE 158. The length value 198 defines the length of the field that follows this length field in this IE 156, 158. Based on the length value 198, the number of node ID and node status pairs 200, 202 can be determined.

Each node ID 200 is paired with a subsequent node status 202 and identifies a node that is scheduled to transmit a secondary beacon after the current secondary beacon. The first node ID following the length value 198 identifies the node that is scheduled to transmit a secondary beacon in the next superframe. Each successive node ID 200 identifies the node scheduled to transmit a secondary beacon in each successive superframe, provided the spatial reuse bit 204 (discussed below) in the paired node status field is set to zero. A node ID 200 with the corresponding spatial reuse bit 204 set to a value of one identifies the node scheduled to transmit a secondary beacon in the same superframe as the node identified in the preceding node ID field 200. The same node ID value may appear more than once in either information element 156 or 158, indicating that the corresponding node may transmit a secondary beacon more than once in the set of secondary beacons scheduled to be transmitted by the nodes specified in that IE. The node ID fields 200 thus define the order of nodes that are to transmit future secondary beacons. The nodes listed in IE 156, 158 are the nodes that are in the extended neighborhood of the node transmitting the current secondary beacon.

Each node status 202 is paired with the preceding node ID 200 and further contains the parameters also shown in FIG. 5D. In accordance with the preferred embodiment, such parameters include a spatial reuse bit 204, an in-range bit 206, a missed beacons field 208 and a reserved field 210. The spatial reuse bit 204 specifies whether the node identified in the paired node ID field 200 is scheduled to transmit a secondary beacon in the same superframe as the node identified in the previous node ID. The in-range bit 206 indicates whether the node identified in the paired node ID field 200 is in communication range of the node transmitting the present secondary beacon frame. If the node identified in the paired node ID field is in communication range of the node transmitting the secondary beacon, then the associated in-range bit 206 is set to one to so indicate. If, however, the node identified in the paired node ID field is not within communication range of the node transmitting the current secondary beacon, the associated in range bit 206 is set to a value of zero. The missed beacons filed 208 indicates the number of the latest, consecutive secondary beacons that were expected from the node identified in the paired node ID field 200, but were not received by the node transmitting the current secondary beacon.

The dynamic node order IE 156 specifies a list of nodes that will be transmitting a beacon following the listed order without repeating the list. The static node order IE 158 specifies a list of nodes that will be transmitting a beacon following the listed order. The listed order of the static node order IE is repeated.

Figure 5E:
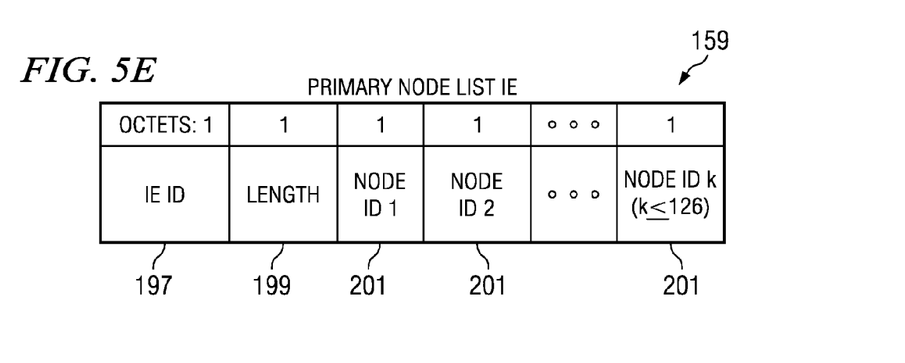

FIG. 5E shows an exemplary embodiment of the format for the primary node list IE 159. This IE 159 specifies a list of primary nodes that will assume responsibility to transmit the primary beacon in the event the current primary node ceases to function in that capacity. It includes an IE ID 197, a length value 199, and one or more node IDs 201. The IE ID 199 indicates a value that defines the information element as a primary node list IE 159. The length value 199 defines the length of the fields that follows the length field. Based on the length value 199, the number of node IDs 201 can be determined. Further, the order of the nodes listed in this IE indicates the order at which other nodes are to take over the role as the primary node should the situation be indicated as noted above that a new primary node is needed. For example, the node identified by node ID 1 will be the next node to assume the role as the primary node.

Figure 5F:
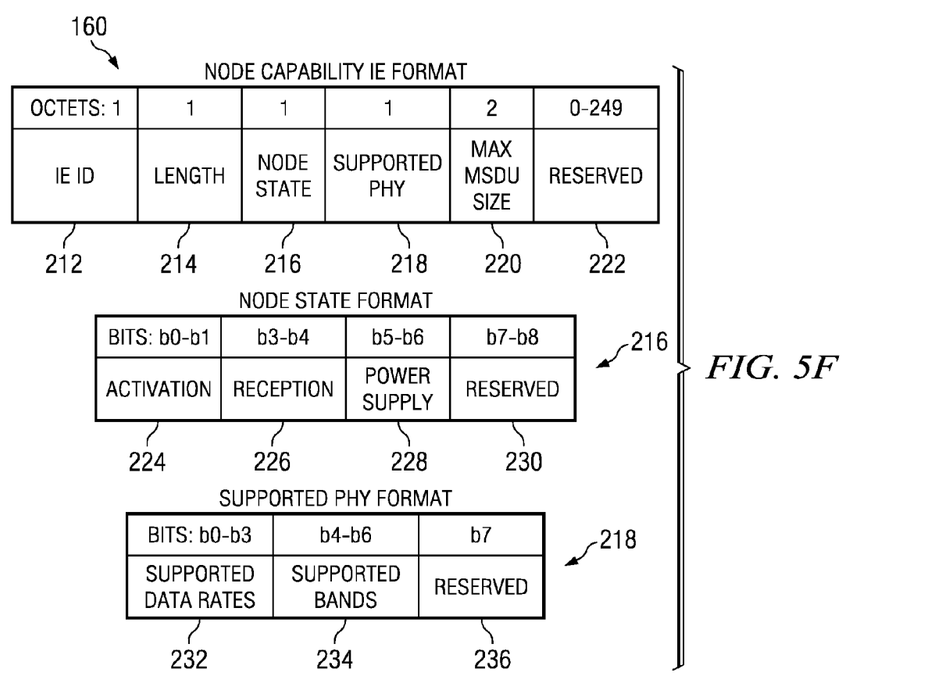

FIG. 5F illustrates the definition of the node capability IE 160. As shown, the node capability IE 160 includes an IE ID 212, a length 214, a node state 216, a supported physical layer (PHY) 218, and maximum medium access control ("MAC") service data unit ("MSDU") size 220, and a reserved field 222. The IE ID 212 is encoded to specify that the current IE is the node capability IE 160 and the length value 214 defines the length of the field that follows this length field in this node capability IE 160. The node state 216 is also illustrated in FIG. 5E as including an activation field 224, a reception field 226, a power supply field 228, and a reserved field 230. The activation field 224 preferably comprises two bits that are encoded to indicate the current state of the node transmitting the beacon. With two bits, the activation field 224 can encode four different states including the "active" state, the "becoming active" state, the "becoming inactive" state, and the "becoming active with another piconet" state. The active state refers to a case where the node is constantly ready to transmit and receive frames. The becoming active state refers to a case where the node is becoming ready to transmit and receive frames. The becoming inactive state refers to a case where the node will not be ready to transmit and receive frames. The becoming active with another piconet refers to a case where the node will be ready to transmit and receive frames belonging to a different piconet but not to the current piconet. The reception field 226 preferably includes three bits to encode as many as eight different scenarios in which the node transmitting the beacon will be receiving frames. The reception field 226 encodes whether the node transmitting the beacon will be receiving frames 1) always (outside its own transmission time), 2) outside time intervals reserved for CSMA-based contention, 3) in time intervals reserved for CSMA-based contention, 4) in time intervals for which this node is specified as a recipient, and 5) in time intervals for which the node specified as the sender of any time intervals with this node specified as the recipient is specified as the sender. Three additional encodings of the reception field 226 are reserved.

The power supply field 228 preferably comprises two bits that are encoded to indicate the current power level of the node transmitting the beacon. The power supply bits can be encoded to indicate a low battery level, a mid-battery level, a high battery level, and a power connection to an alternating current (AC) power source. The supported PHY field 218 of the node capability IE 160 contains a supported data rates field 232, a supported bands field 234, and a reserved field 236. The supported data rates field 232 indicates the data rates supported by the node transmitting this frame and may be encoded as the same as in the PHY header (not specifically shown) and following the same bit order as well. The supported bands field 234 indicates the frequency bands supported by the node transmitting this beacon frame and also is encoded as the same as in the PHY header. The max MSDU size field 220 preferably specifies the maximum size, in units of octets, of MSDUs supported by the node transmitting this frame.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A method, comprising:
    a wireless transceiver of a primary node from a plurality of nodes transmitting a first beacon in a superframe, said first beacon comprising wireless medium access information that specifies the plurality of nodes that are to communicate across a wireless medium in said superframe, said wireless medium access information further specifying a first list of nodes that are to transmit first beacons in subsequent superframes upon missing said first beacons for a predetermined number of superframes; and
    one or more secondary nodes transmitting a second beacon in said superframe, said second beacon also comprising said wireless medium access information.

2. The method of claim 1 wherein said wireless medium access information further comprises a list of nodes that are to transmit said second beacon in successive superframes and an order at which such nodes are to take turns to transmit said second beacons.

3. The method of claim 1 further comprising one or more nodes other than the primary and secondary nodes transmitting a third beacon in said superframe, said third beacon also comprising said wireless medium access information.

4. A method, comprising:
a wireless transceiver of one or more secondary nodes receiving a first beacon in a superframe, said first beacon comprising wireless medium access information that specifies a plurality of nodes that are to communicate across a wireless medium in said superframe, said wireless medium access information further specifying a first list of nodes that are to transmit first beacons in subsequent superframes upon missing said first beacons for a predetermined number of superframes; and
transmitting a second beacon in said superframe, said second beacon also comprising said wireless medium access information.

5. The method of claim 4 further comprising transmitting said first beacon.

6. The method of claim 4 wherein said wireless medium access information further comprises a second list of nodes that are to transmit said second beacons in successive superframes and an order at which such nodes are to turn turns to transmit said second beacons.

7. The method of claim 4 further comprising transmitting a third beacon in said superframe, said third beacon also comprising said wireless medium access information.

8. A method, comprising:
a wireless transceiver of a primary node transmitting a first beacon in a superframe, said first beacon comprising wireless medium access information that specifies a plurality of nodes that are to communicate across a wireless medium in said superframe, said wireless medium access information further specifying a first list of nodes that are to transmit first beacons in subsequent superframes upon missing said first beacons for a predetermined number of superframes; and
receiving a second beacon in said superframe, said second beacon also comprising said wireless medium access information.

9. The method of claim 8 wherein said wireless medium access information further comprises a second list of nodes that are to transmit said second beacons in successive superframes and an order at which such nodes are to take turns to transmit said second beacons.

10. A node operable in a wireless network, comprising:
host logic; and
a wireless transceiver coupled to said host logic, said wireless transceiver receives a first beacon within a superframe, said first beacon comprising wireless medium access information pertaining to said superframe, and said wireless transceiver transmits a second beacon within said superframe, said second beacon comprises wireless medium access information, wherein the wireless medium access information in the first and second beacons is identical, wherein said wireless transceiver waits for its turn to transmit the second beacon in a successive superframe.

11. The node of claim 10 wherein said wireless medium access information further comprises a second list of nodes that are to transmit said second beacons in successive superframes and an order at which such nodes are to take turns to transmit said second beacons.

12. A system, comprising:
a plurality of nodes, including a primary node and one or more secondary nodes,
wherein said primary node transmits in a superframe a first beacon comprising wireless medium access information specifying a plurality of nodes that are to access the wireless medium in said superframe, and wherein a node of said one or more secondary nodes transmits in said superframe a secondary beacon also
comprising said wireless medium access information, said wireless medium access information further specifying a first list of nodes that are to transmit first beacons in subsequent superframes upon missing said first beasons for a predetermined number of superframes.

13. The system of claim 12 wherein said wireless medium access information further comprises a second list of nodes that are to transmit said second beacons in successive superframes and an order at which such nodes are to take turns to transmit said second beacons.

* * * * *